United States Patent [19]

Goto et al.

[11] Patent Number: 5,160,385
[45] Date of Patent: Nov. 3, 1992

[54] HEAVY DUTY PNEUMATIC TIRES

[75] Inventors: Akihito Goto, Kodaira; Yasutaka Enoki, Sayama, both of Japan

[73] Assignee: Bridgestone Corporation, Tokyo, Japan

[21] Appl. No.: 562,984

[22] Filed: Aug. 6, 1990

[30] Foreign Application Priority Data

Aug. 8, 1989 [JP] Japan ..................... 1-203805
Aug. 21, 1989 [JP] Japan ..................... 1-214555
Aug. 21, 1989 [JP] Japan ..................... 1-214556

[51] Int. Cl.⁵ ............................................. B60C 11/11
[52] U.S. Cl. ........................... 152/209 R; 152/DIG. 1
[58] Field of Search ........ 152/209 R, 209 D, DIG. 1, 152/DIG. 3, DIG. 4

[56] References Cited

U.S. PATENT DOCUMENTS 3,926,238 12/1975 Vorih ............................. 152/209 R
4,345,632 8/1982 Takagawa et al. ............. 152/209 R
4,683,928 8/1987 Yahagi ........................... 152/209 R
4,884,606 12/1989 Matsuda et al. .............. 152/DIG. 3
4,945,966 8/1990 Ogawa .......................... 152/209 R

FOREIGN PATENT DOCUMENTS 1102677 10/1955 France ........................... 152/209 R
0001508 1/1986 Japan ............................ 152/DIG. 3
1-164602 6/1989 Japan ............................ 152/209 R
2-293204 12/1990 Japan ............................ 152/209 R
0357419 9/1931 United Kingdom ........... 152/209 R
0755137 8/1956 United Kingdom ........... 152/209 R

OTHER PUBLICATIONS

Doral "Dune Digger" 1978 Tread Design Guild, 1978, p. 137.
European Search Report Patent Abstracts of Japan, vol. 12, No. 41 (M-666)(2888) Feb. 6, 1988, & JP-A-62 194908 (Sumitomo Rubber Ind. Ltd.) Aug. 27, 1987.
Patent Abstracts of Japan, vol. 11, No. 158 (M-591)(2605) May 22, 1987, & JP-A-61 291203 (Bridgestone Corporation) Dec. 22, 1986.
Patent Abstracts of Japan, vol. 10, No. 37 (M-453)(2094) Feb. 14, 1986, & JP-A-60 189608 (Yokohama Gomu K.K.) Sep. 27, 1985.

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

In a heavy duty pneumatic tire, a protrusion is disposed in an intersect portion between circumferential groove and transverse groove in a tread of block pattern, whereby stone capturing is prevented. Furthermore, blind sipe is formed in each block of at least center and second block rows, whereby heel and toe wear as well as shoulder wear are prevented.

13 Claims, 6 Drawing Sheets

FIG_1a
PRIOR ART
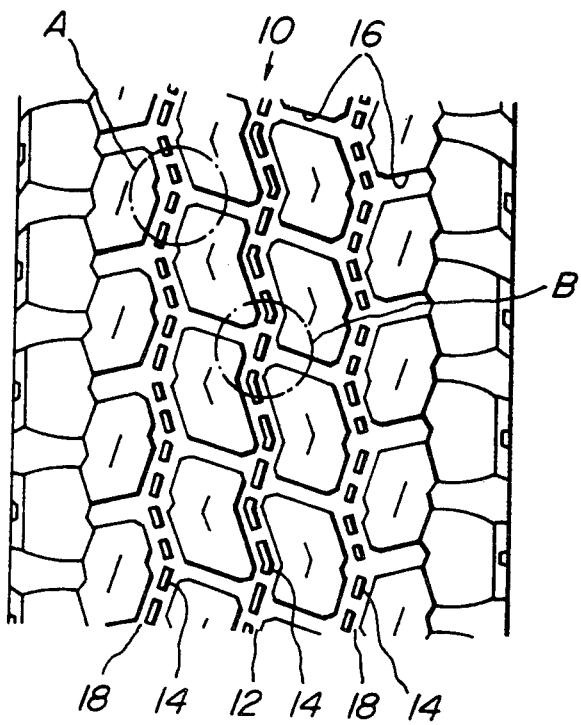
FIG_1b
PRIOR ART
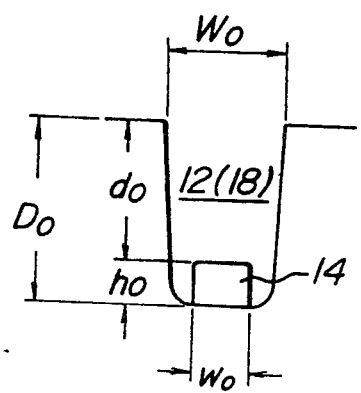

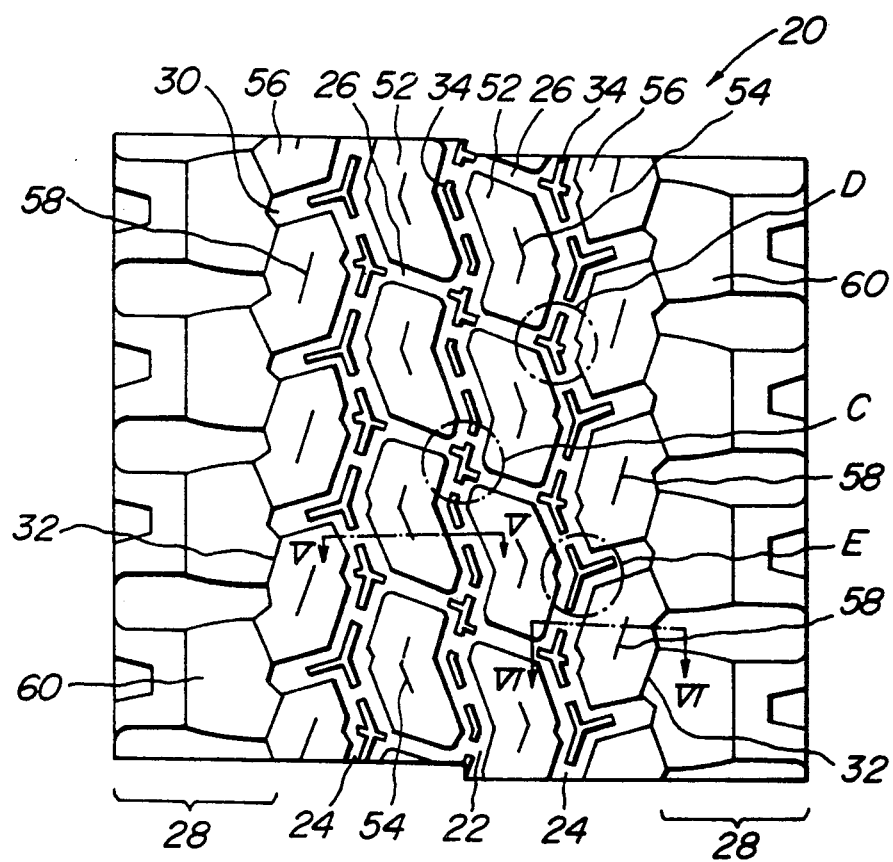
FIG_2

FIG_3a
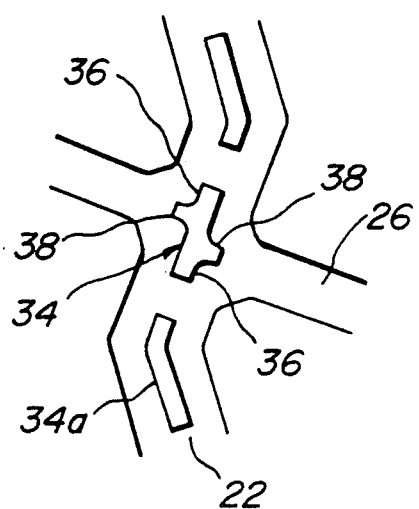
FIG_3b
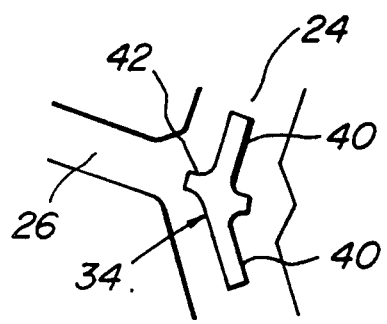
FIG_3c
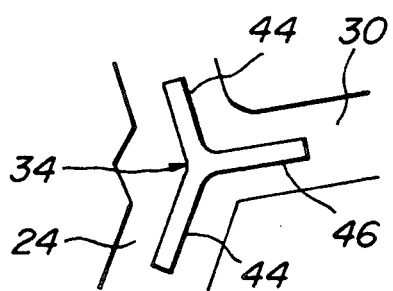

FIG_4
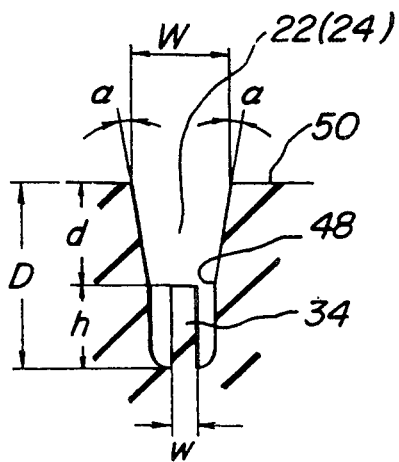
FIG_5
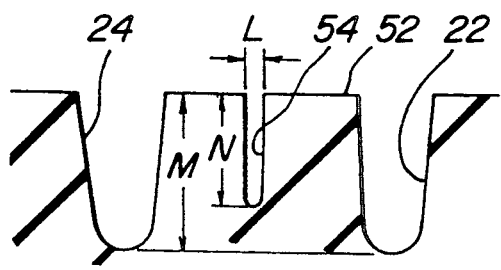
FIG_6
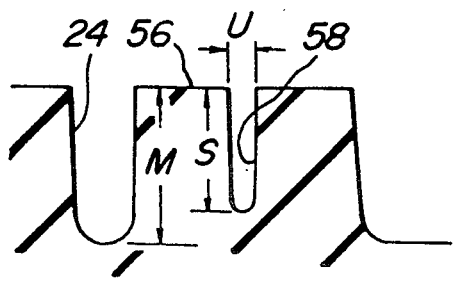

FIG_7
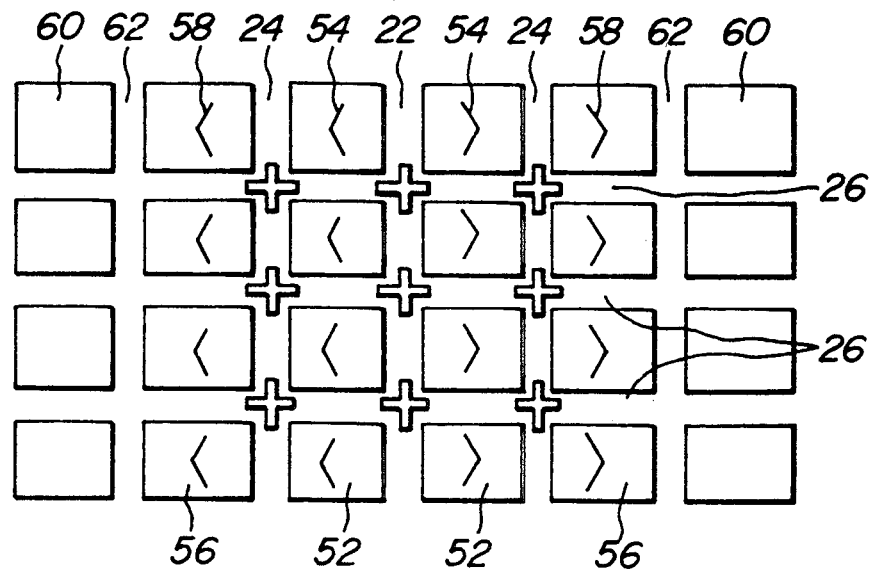
FIG_8
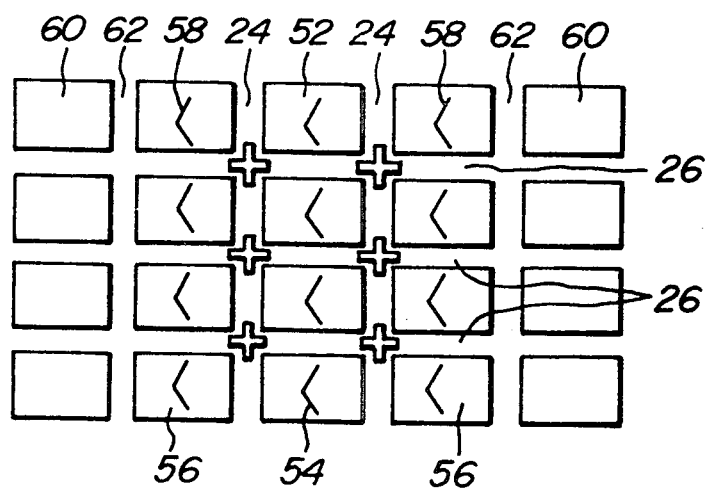

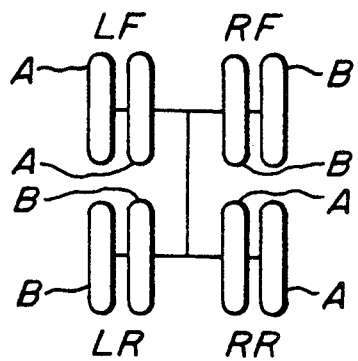
FIG_9a
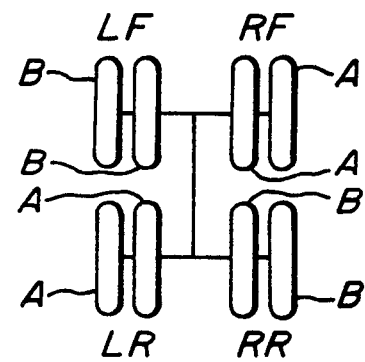
FIG_9b

HEAVY DUTY PNEUMATIC TIRES

BACKGROUND OF THE INVENTION

1. Field of the Invention

This invention relates to a heavy duty pneumatic tire for use in tuck and bus, and more particularly to a heavy duty pneumatic radial tire having a tread pattern suitable for reducing tire damage due to stone capturing.

2. Related Art Statement

When a heavy duty pneumatic tire of this type is run at such a state that stones scattered on road are held in grooves of the tread portion, the groove bottom portion is damaged due to the loading repeatedly applied to the groove portion capturing a stone, and further such a damage may grow inside the tire.

In order to prevent tire damage due to such stone capturing, there has hitherto been known a heavy duty pneumatic tire as shown in FIGS. 1a and 1b, wherein protrusions 14 for the prevention of stone capturing are disposed in a bottom of a circumferential groove 12 substantially extending in a circumferential direction of a tire 10 along the groove extending direction so as to suppress stone capturing in the circumferential groove 12 and discharge the captured stone from this groove through the elastic force of the protrusion 14 during running.

Moreover, a transverse groove 16 crossing with the circumferential groove 12 may be arranged in the tread of such a heavy duty pneumatic tire so as to improve traction and braking performances. In this case, the stone capturing in the transverse groove is naturally anticipated. However, a stone captured by the transverse groove is easily discharged by the stepping-in and kicking out motion of tread rubber during the running. If the protrusion for the prevention of stone capturing is disposed in the bottom of the transverse groove, the radius of the groove bottom becomes small and consequently cracking is apt to be caused, so that the arrangement of the protrusion is not usually made in the transverse groove.

Even in such a tire provided with the protrusions for the prevention of stone capturing, however, intersect portions between the circumferential groove 12 and the transverse groove 16, e.g. regions A and B are composed of sides and corner portions of three or four blocks constituting island portions of the tread, respectively, so that when stone is captured by the intersect portion at once, there is also caused the aforementioned problem resulting from the stone capturing because the captured stone is elastically engaged with any of the rubber blocks and the protrusions 14 for the prevention of stone capturing disposed along the circumferential groove 12 can not sufficiently develop its function to maintain the stones at the captured state. Moreover, such a problem is known to be caused irrespective of the tire structure.

In the heavy duty pneumatic tire having the block pattern as in the above conventional tire, shoulder wear is apt to be caused in the blocks at the shoulder portion of the tread, while heel and toe wear is apt to be caused in the blocks of the central portion of the tire. For this end, a blind sipe not extending to the transverse groove and the circumferential groove is formed in each block as shown in FIG. 1a. Thus, the rigidity of each block is lowered by the blind sipe to reduce any shearing force produced at the ground contact area of the tread in the circumferential direction during the stepping-in and kicking-out motion, whereby the heel and toe wear is controlled.

In this heavy duty pneumatic tire, however, there is still a problem that the shoulder wear is apt to be caused at the blocks of the shoulder portion most influenced by lateral force.

SUMMARY OF THE INVENTION

With the foregoing in mind, it is an object of the invention to provide a heavy duty pneumatic tire which can prevent tire damage resulting from the stone capturing at the intersect portion between the grooves.

It is another object of the invention to provide a heavy duty pneumatic tire which can simultaneously and effectively control shoulder wear at the shoulder portion and the heel and toe wear at the central portion in addition to the prevention of stone capturing.

According to the invention, there is the provision of a heavy duty pneumatic tire comprising a tread having a block pattern composed of island portions and groove portions and protrusions for the prevention of stone capturing disposed in the bottoms of the grooves, characterized in that a protrusion disposed at an intersect portion between at least two grooves among said protrusions is provided with a projected part protruding in an extending direction of each of said grooves and disconnected from the island portion.

In a preferred embodiment of the invention, the tread has a block pattern composed of at least five block rows defined by plural circumferential grooves and plural transverse grooves in the widthwise direction of the tire. In all of the block rows, each block is provided with a blind sipe formed along the circumferential direction of the tire so as not to arrive at each transverse groove. Alternatively, each shoulder block of a block row arranged at each end portion in widthwise direction of the tread has no sipe, while each center block of a block row arranged at a central portion in widthwise direction of the tread and each second block of a block row arranged between the shoulder block and the center block in widthwise direction of the tread are provided with a blind sipe formed along the circumferential direction of the tire so as not to arrive at each transverse groove.

BRIEF DESCRIPTION OF THE DRAWINGS

The invention will be described with reference to the accompanying drawings, wherein:

FIG. 1a is a partial plan view of the conventional tire having a block pattern;

FIG. 1b is a schematic section view of a circumferential groove provided with a protrusion for the prevention of stone capturing in the conventional tire;

FIG. 2 is a partial plan view of an embodiment of the heavy duty pneumatic tire according to the invention;

FIGS. 3a to 3c are schematically enlarged views of protrusions for the prevention of stone capturing at regions C, D and E in FIG. 2, respectively;

FIG. 4 is a schematic section view of a circumferential groove provided with a protrusion for the prevention of stone capturing in the tire of FIG. 2;

FIGS. 5 and 6 are sectional views taken along lines V—V and VI—VI in FIG. 2, respectively;

FIGS. 7 and 8 are schematic views of tread patterns in another embodiments of the heavy duty pneumatic tire according to the invention; and FIGS. 9a and 9b are schematic views showing a test method for the tire according to the invention and comparative tire.

DESCRIPTION OF THE PREFERRED EMBODIMENT

In the heavy duty pneumatic tire according to the invention, the projected portion of the protrusion for the prevention of stone capturing, which is arranged at the intersect portion between the circumferential groove and the transverse groove dividing the island portion into blocks, projects toward the groove extending direction, so that such a projected part hinders the stone capturing at the intersect portion. Consequently there is not caused stone capturing at the intersect portion and the tire damage due to the stone capturing can effectively be prevented.

Furthermore, cracking due to the reduction of the radius at the groove bottom does not occur because the projected part is not extended along the transverse groove.

FIG. 2 shows a tread pattern of a heavy duty pneumatic tire 20 according to the invention, which comprises a circumferential groove 22 arranged on an equator of the tire and extending substantially along the equatorial plane in the circumferential direction. Two circumferential grooves 24, 24 sandwiching the circumferential groove 22 are separated away from each other in the widthwise direction of the tire. Transverse grooves 26 are arranged between the circumferential grooves 24, 24 so as to cross with the circumferential groove 22 at a constant angle with respect to the equatorial plane of the tire and separated from each other in the circumferential direction. Transverse grooves 30 are each slantly arranged between the circumferential groove 24 and a shoulder portion 28 at a constant angle with respect to the equatorial plane of the tire and the circumferential groove 24 and separated from each other. Moreover, numeral 32 is a narrow groove formed in the shoulder portion 28 so as to extend substantially in parallel to the equatorial plane of the tire, which acts to suppress the uneven wear of rubber blocks adjacent to the shoulder portion 28.

Onto the groove bottoms of the circumferential grooves 22 and 24 are disposed protrusions 34 for the prevention of stone capturing to separate from each other in the circumferential direction of the tire along the groove extending direction. In this case, protrusions 34 are arranged in at least intersect portion between the circumferential groove 22 and the transverse groove 26, intersect portion between the circumferential groove 24 and the transverse groove 26 and intersect portion between the circumferential groove 24 and the transverse groove 30, respectively. Of course, the top face of the protrusion 34 for the prevention of stone capturing is located below the surface of the tread portion inward in the radial direction of the tire.

According to the invention, the protrusion 34 disposed in the intersect portion between the circumferential groove 22 and the transverse groove 26 at a region C shown in FIG. 2 is provided with projected parts 36 projecting toward the extending direction of the circumferential groove 22 and projected parts 38 projecting toward the extending direction of the transverse groove 26 as shown in FIG. 3a. Furthermore, the protrusion 34 disposed in the intersect portion between the circumferential groove 24 and the transverse groove 26 in a region D shown in FIG. 2 is provided with projected parts 40 projecting toward the extending direction of the circumferential groove 24 and projected parts 42 projecting toward the extending direction of the transverse groove 26 as shown in FIG. 3b. Also, the protrusion 34 disposed in the intersect portion between the circumferential groove 24 and the transverse groove 30 in a region E shown in FIG. 2 is provided with projected parts 44 projecting toward the extending direction of the circumferential groove 24 and a projected part 46 projecting toward the extending direction of the transverse groove 30 as shown in FIG. 3c. As illustrated in FIG. 3c the projection parts 38, 42 and 46 are not connected to blocks 52 defining island portions.

In the heavy duty pneumatic tire according to the invention, the protrusions 34 disposed in the intersect portions between the circumferential groove 22 and the transverse groove 26, between the circumferential groove 24 and the transverse groove 26 and between circumferential groove 24 and the transverse groove 30, i.e. projected parts of these protrusions projecting toward the groove extending direction hinder the stone capturing at these intersect portions. Thus, tire damage due to stone capturing can effectively be prevented.

Furthermore, since each of the protrusions for the prevention of stone capturing has the projected part projecting toward the groove extending direction, the compression rigidity of the protrusion itself becomes high. Therefore, protrusion 34 is not easily crushed even at the stone captured state. Consequently the discharge of a captured stone can easily be made by elastic restoring force of the projected part during the running of the tire.

Moreover, the protrusions 34 are arranged in the circumferential grooves 22 and 24 therealong so as to separate away from each other in the circumferential direction, so that the drainage performance is further improved as compared with the case of arranging the continuous protrusion in the groove therealong. In the illustrated embodiment, the other protrusions 34a, (FIG. 3a) separated from each other in the groove extending direction are arranged between the protrusions 34 each disposed at the intersect portion between the circumferential groove 22 and the transverse groove 26 along the bottom portion of the circumferential groove 22. As a result stone capturing is prevented in the portions of the circumferential groove 22 other than the intersect portions. In addition, the projected part 36 of the protrusion 34 disposed in the intersect portion may be connected to the protrusion 34a disposed in the circumferential groove 22 therealong.

In order to improve the wear resistance of the tire among some performance required in the heavy duty pneumatic tire, there is considered a method of making the depth of the groove in the tread portion deep, but in this case there is caused a problem that stone capturing is apt to be easily caused.

In FIG. 4 is partly shown the tread pattern of another embodiment of the heavy duty pneumatic tire according to the invention which can attain the desired effect of preventing stone capturing by selecting the shape and size of the protrusion 34 for the prevention of stone capturing with respect to the circumferential groove 22. The tread pattern of this tire is the same as in the embodiment of FIG. 2, so that it is omitted for simplification other than the structure of the protrusion disposed in the cirucmferential groove.

The opposed sidewalls 48 of the circumferential groove 22 (24) extend to a top of the protrusion 34 for the stone capturing vertically disposed on the bottom of the circumferential groove or a height h of the protrusion 34 perpendicular to the tread surface 50. The sidewalls are enlarged from the vicinity of the top of the protrusion 34 toward the tread surface at a given inclination angle $\alpha$ with respect to a plane perpendicular to the tread surface.

When the width of the circumferential groove 22 (24) at the tread surface 50 is W, the depth of the circumferential groove 22 (24) from the tread surface is D, the depth from the tread surface 50 to the top of the protrusion 34 is d and the height of the protrusion 34 from the bottom of the circumferential groove 22 (24) is h, the shape and size of the protrusion 34 are selected so that a ratio of the width W of the circumferential groove 22 (24) to the depth d of the protrusion d satisfies a relation of $W/d \geq 0.8$ and a ratio of the height h of the protrusion 34 to the depth D of the circumferential groove 22 (24) satisfies a relation of $0.4 \leq h/D \leq 0.5$.

When the ratio W/d is less than 0.8, stone capturing is apt to be caused. On the other hand, when the ratio h/D is less than 0.4, W/d becomes too small and stone capturing is apt to be caused. When it exceeds 0.5, the rigidity against the compression force of the protrusion 34 becomes small and the desired effect of preventing stone capturing and the drainage performance can not be developed.

In order to ensure rigidity against the compression force of the protrusion 34, the shape and size of the protrusion 34 is preferably selected so that a ratio of the width w of the protrusion 34 to the height h thereof satisfies a relation of $w/h \geq 0.2$ and a ratio of length l of the protrusion along the circumferential groove 22 (24) to the height h thereof satisfies a relation of $l/h \geq 1.0$.

In the preferred embodiment of the invention, in order to prevent the occurrence of shoulder wear in the shoulder portion and heel and toe wear in the remaining central portion in addition to the prevention of stone capturing, the heavy duty pneumatic tire has a tread pattern composed of at least five block rows defined by plural circumferential grooves and plural transverse grooves in the widthwise direction of the tire. In all of these block rows, each block is provided with a blind sipe formed along the circumferential direction of the tire so as not to arrive at each transverse groove. Alternatively, each shoulder block of a block row arranged at each end portion in widthwise direction of the tread has no sipe, while each center block of a block row arranged at a central portion in widthwise direction of the tread and each second block of a block row arranged between the shoulder block and the center block in widthwise direction of the tread are provided with a blind sipe formed along the circumferential direction of the tire so as not to arrive at each transverse groove.

The mechanism of generating shoulder wear in the shoulder block is as follows. In the conventional tire, blind sipe has been formed in the shoulder block in addition to the center block and second block, so that the shearing force in circumferential direction was reduced in the braking and traction. On the other hand, if side force is applied to the tire, since the shoulder block is close to the input side of the side force, the motion of the tire in the widthwise direction becomes considerably large compared with the case of forming no sipe in the shoulder block. As a result, the wearing quantity (force $\times$ motion) of the shoulder block becomes large to generate the shoulder wear.

In order to prevent the shoulder wear of the shoulder block, therefore, it is necessary to control the motion of the shoulder block. For this end, the blind sipe is not formed in the shoulder block according to the invention. If the blind sipe is formed in the shoulder block, it is necessary that a ratio of volume of the blind sipe to volume of the shoulder block containing such a blind sipe (sipe volume ratio) is not more than 0.5%. When the sipe volume ratio is more than 0.5%, the motion of the shoulder block under an influence of side force becomes large to cause shoulder wear.

Furthermore, it is preferable that the rubber constituting the shoulder block has a modulus at 300% elongation of 115–165 kgf/cm$^2$. When the modulus is less than 115 kgf/cm$^2$, the motion of the shoulder block under an influence of side force becomes too large, while when it exceeds 165 kgf/cm$^2$, the reaction force of the shoulder block under an influence of side force becomes large to make the wearing quantity large.

On the other hand, the mechanism of generating the heel and toe wear in the center block and the second block is as follows. Since the ground contact pressure at the center block and the second block is higher than that of the shoulder block, the motion bearing in the braking and traction becomes larger in the center block and the second block than in the shoulder block. As a result, the shearing force in circumferential direction is large at the center block and the second block in the stepping-in and kicking-out and the wearing quantity becomes large to generate the heel and toe wear.

In order to prevent the heel and toe wear of the center block and the second block in the stepping-in and kicking-out, therefore, it is necessary to control the shearing force in circumferential direction. For this end a blind sipe is formed in each of the center block and the second block according to the invention. In this case, a ratio of volume of the blind sipe to volume of the block containing such a blind sipe (sipe volume ratio) in each of the center block and the second block is within a range of 0.5–3.0%, preferably 1.2–1.7%. When the sipe volume ratio is less than 0.5%, the shearing force in circumferential direction can not sufficiently be reduced. When it exceeds 3.0%, the shearing force in circumferential direction lowers, but the motion of the block as a whole becomes too large to increase the wearing quantity.

Furthermore, it is preferable that the rubber constituting each center block and the second block has a modulus at 300% elongation of 90–140 kgf/cm$^2$. When the modulus is less than 90 kgf/cm$^2$, the shearing force in circumferential direction is sufficiently lowered, but the motion of the block becomes too large to increase the wearing quantity, while when it exceeds 140 kgf/cm$^2$, the sufficient reduction of the shearing force in circumferential direction can not be obtained. Moreover, the modulus at 300% elongation of rubber in the center block and the second block is may be higher than that of the shoulder block.

According to the invention, the blind sipe to be formed in each of the center block, the second block and the shoulder block has a width of not more than 2.5 mm. When the width of the blind sipe exceeds 2.5 mm, the stone capturing is apt to be caused and also the difference in the rigidity around the blind sipe is large to cause the shoulder wear as well as the heel and toe wear. Furthermore, the blind sipe has a depth corresponding to 25–110%, preferably 70–80% of the height of each block. When the depth of the blind sipe is less than 25%, the period of holding the desired effect against the wearing of the tread becomes short, while when it exceeds 110%, the rubber thickness from the bottom of the blind sipe to the belt becomes too thin.

The heavy duty pneumatic tire having a block pattern provided with the blind sipe according to the invention comprises a radial carcass toroidally extended between a pair of bead cores and wound around the bead core from inside of the tire to outside thereof, an inner surface of which is covered with an inner liner. Moreover, the radial carcass has a well-known structure composed of one or a few rubberized plies containing cords arranged in the radial direction of the tire.

The crown portion of the carcass is a tread portion having a thick gauge. Furthermore, the well-known non-extensible belt layer is disposed between the tread portion and the radial carcass to reinforce the tread portion.

In the tread pattern of the tread portion in the heavy duty pneumatic radial tire 20 as shown in FIG. 2, three circumferential grooves 22, 24, 24 are arranged zigzag in the circumferential direction of the tire at given intervals in the widthwise direction thereof in the illustrated embodiment. Furthermore, many transverse grooves 26 are arranged at approximately equal intervals in the circumferential direction of the tire so as to cross with at least a portion of each of the circumferential grooves 22, 24. Moreover, the depth of the circumferential groove 22, 24 is approximately equal to that of the transverse groove 26.

A blind sipe 54 is formed in each center block 52 of two block rows defined by these circumferential grooves 22, 24, 24 and transverse grooves 26 and located at a central portion of the tread in the widthwise direction of the tire. The blind sipe 54 is located at the central portion of the center block 52 in the widthwise direction of the tire along the circumferential direction of the tire. In this case, both end portions of the blind sipe are not opened to the respective transverse grooves 26 in the circumferential direction of the tire. Also, the blind sipe 54 is bent in accordance with the shape of the center block 52 in the circumferential direction of the tire.

As shown in FIG. 5, the depth N of the blind sipe 54 is 76% of the depth M of the circumferential groove 24, and the width L of the blind sipe 54 is 1.2 mm. Furthermore, the sipe volume ratio of the blind sipe 54 is 1.57% in the center block 52.

A block row of second blocks 56 is arranged outside the row of the center blocks 52 in the widthwise direction of the tire. A blind sipe 58 is formed in each of the second block 56. This blind sipe 58 is located at the central portion of the second block 56 in the widthwise direction of the tire along the circumferential direction of the tire. In this case, both end portions of the blind sipe are not opened to the respective transverse grooves 26 in the circumferential direction of the tire. Also, the blind sipe 58 is somewhat slanted in accordance with the shape of the second block 56 in the widthwise direction of the tire.

As shown in FIG. 6, the depth S of the blind sipe 58 is 76% of the depth M of the circumferential groove 24, and the width U of the blind sipe 58 is 1.2 mm. Furthermore, the sipe volume ratio of the blind sipe 58 is 1.66% in the second block 56.

Further, a block row of shoulder blocks 60 is formed in each widthwise end portion of the tread. In the illustrated embodiment, the sipe is not formed in the shoulder block 60. If the sipe is formed in the shoulder block 60, the sipe volume ratio should be not more than 0.5% in the shoulder block 60.

The rubber of the center block 52 and the second block 56 is composed of a tread rubber having a modulus at 300% elongation of 115 kg/cm$^2$, and the shoulder block 60 is composed of a tread rubber having a modulus at 300% elongation of 141 kg/cm$^2$.

When the vehicle provided with such tires is at braking state or traction state, force is applied from road surface to the center block 52, second block 56 and shoulder block 60. Since the blind sipes 54 and 58 are arranged in the center block 52 and the second block 56 having a given modulus at 300% elongation at a given sipe volume ratio, the ground contact pressure is lowered at the center block 52 and the second block 56. Thus, the increase of shearing force in cirucmferential direction at stepping-in and kicking-out is prevented and consequently the wearing quantity at these blocks becomes small to control the occurrence of heel and toe wear.

On the other hand, when the vehicle is at a cornering state, a large side force is applied to the shoulder block 60 located at the input side of the side force. Since the shoulder block has a given modulus at 300% elongation and is not provided with a sipe or even if the sipe is formed in the shoulder block, the sipe volume ratio is restricted to not more than 0.5%, the motion of the shoulder block 60 in the widthwise direction of the tire is lowered and hence the wearing quantity becomes small to control the shoulder wear.

Another embodiment of the heavy duty pneumatic tire according to the invention has a tread pattern as shown in FIG. 7. In this case, the tread portion is divided into six rectangular block rows by five circumferential grooves 22, 24 and 62 located at given intervals in the widthwise direction of the tire and many transverse grooves 26 located at given intervals in the circumferential direction of the tire. In this embodiment, the same effect as in the aforementioned embodiment is obtained.

The other embodiment of the heavy duty pneumatic tire according to the invention has a tread pattern as shown in FIG. 8. In this case, the tread portion is divided into five rectangular block rows by four circumferential grooves 24 and 62 located at given intervals in the widthwise direction of the tire and many transverse grooves 26 located at given intervals in the circumferential direction of the tire. In this embodiment, the center blocks 52 form a single block row, but the same effect as in the aforementioned embodiment is obtained.

The following examples are given in illustration of the invention and are not intended as limitations thereof.

EXAMPLE 1

This example shows the comparison in the performance of preventing stone capturing between the heavy duty pneumatic tire according to the invention and the conventional heavy duty pneumatic tire.

Test tire

Tire having a tire size of 285/75 R24.5 and a general radial structure

Invention tire

This tire has a tread pattern shown in FIG. 2, wherein the width W and depth D of the circumferential groove 22 are 12.0 mm and 22.0 mm, respectively, and the depth d, height h and width w of the protrusion 34 for the prevention of stone capturing are 12.4 mm, 9.6 mm and 2.5 mm, respectively; and the width W and depth D of the circumferential groove 24 separated from the circumferential groove 22 at a distance of 29.4 mm are 13.0 mm and 25.0 mm, respectively, and the depth d, height h and width w of the protrusion 34 are 13.4 mm, 1.6 mm and 2.5 mm, respectively; the width and depth of the transverse groove 26 disposed at an interval of 50.1 mm in the circumferential direction of the tire and slantly crossing with the circumferential groove along the equatorial plane of the tire are 7.0 mm and 22.0 mm, respectively; and the width and depth of the transverse groove 30 disposed at an interval of 45.5 mm in the circumferential direction and slantly crossing with the circumferential groove are 11.0 mm and 25.0 mm, respectively.

Since the width W of the circumferential groove 22 is narrower by 1 mm than that of the circumferential groove 24, if the depths d of these circumferential grooves are the same, the performance of preventing the stone capturing in the circumferential groove 22 is poorer than that of the circumferential groove 24. For this end, the performance of preventing the stone capturing in the circumferential groove 22 is ensured to be equal to that of the circumferential groove 24 by making the depth of the protrusion in the circumferential groove 22 shallower than that in the circumferential groove 24. In this case, if the depth of the circumferential groove 22 is equal to that (25.0 mm) of the circumferential groove 24, the ratio (h/D) of height h of the protrusion to the depth D of the circumferential groove is 0.504, which is outside the range of $0.4 \leq h/D \leq 0.5$ defined in the invention, so that the depth D of the circumferential groove 22 is shallowed to 22.0 mm.

When the tire is mounted onto a driving shaft, the heel and toe wear is apt to be caused due to the motion of rubber blocks in the central portion of the tread based on the traction force. In the invention tire, the depth D of the circumferential groove 22 is shallower than that of the circumferential groove 24, so that the rigidity of rubber blocks in the central portion of the tread becomes higher than the rigidity of rubber blocks in the other portion of the tread to control the motion of rubber blocks in the central portion of the tread, whereby the occurrence of uneven wear can effectively be prevented.

The invention tire having the protrusion for the prevention of stone capturing in the intersect portion between the grooves has naturally a sufficient performance for the prevention of stone capturing as compared with the conventional tire even when the depth D of the circumferential groove 22 is equal to that of the circumferential groove 24.

Conventional tire:

This tire has a tread pattern provided with the protrusion for the prevention of stone capturing as shown in FIGS. 1a and 1b. In this case, the width at tread surface $W_0$, width at bottom and depth $D_0$ of the circumferential groove 12 are 12.0 mm, 10.5 mm and 22.0 mm, respectively, and the depth $d_0$, height $h_0$ and width $w_0$ of the protrusion are 16.0 mm, 6.0 mm and 6.0 mm, respectively; the width $W_0$, width at bottom and depth $D_0$ of the circumferential groove 18 separated from the circumferential groove 12 at a distance of 29.4 mm are 13.0 mm, 10.5 mm and 25.0 mm, respectively, and the depth $d_0$, height $h_0$ and width $w_0$ of the protrusion are 19.0 mm, 6.0 mm and 4.4 mm, respectively; the width and depth of the transverse groove disposed at an interval of 50.1 mm in the circumferential direction of the tire and slantly crossing with the circumferential groove along the equatorial plane of the tire are 7.0 mm and 22.0 mm, respectively; and the width and depth of the transverse groove disposed at an interval of 45.5 mm in the circumferential direction of the tire and slantly crossing with the circumferential groove along the equatorial plane of the tire are 11.0 mm and 25.0 mm, respectively.

Test method

The tire of the invention and the conventional tire are mounted onto front wheel and rear wheel in the same vehicle and actually run over a distance of 20,000 km, and thereafter the number of captured stones per one tire was measured by an index on the basis that the conventional tire is 100.

Moreover, in order to make the test conditions same, the invention tire (A) and the conventional tire (B) were alternately mounted onto a front right side (RF), a front left side (LF), a rear right side (RR) and a rear left side (LR) in the running direction of the vehicle as shown in FIGS. 4a and 4b.

Test results

The measured results are shown in Table 1. Moreover, the smaller the index value, the better the performance for the prevention of stone capturing.

TABLE 1

|  | Invention tire | Conventional tire |
| --- | --- | --- |
| Evaluation | 70 | 100 |

As seen from Table 1, according to the invention tire, the performance for the prevention of stone capturing is largely improved as compared with the conventional tire.

EXAMPLE 2

There were provided two test tires having a tire size of 285/75 R24.5, one of which tires being the invention tire having a tread pattern as shown in FIGS. 2, 5 and 6 and the other being the conventional tire having the same tread pattern as in the invention tire except that each block has no blind sipe. Each of these test tires was mounted onto a normal rim and run on general road under normal internal pressure and load over a distance of 100,000 km, and thereafter the worn state was measured to obtain results as shown in the following Table 2.

TABLE 2

| Kind of tire | Conventional tire | Invention tire |
| --- | --- | --- |
| Stepwise difference of heel and toe wear | 4.0 mm | 1.5 mm |
| Shoulder wear width × stepwise difference | 15 mm × 2.4 mm | 2 mm × 1.5 mm |

As seen from Table 2, the stepwise difference of heel and toe wear in the heavy duty pneumatic radial tire according to the invention is smaller than that of the conventional tire having no blind sipe, while the shoulder wear width × stepwise difference thereof in the tire according to the invention are smaller than those of the conventional tire. As a result, the tire according to the invention is superior to the conventional tire in the wear resistance in addition to the prevention of stone capturing.

As mentioned above, according to the invention, the performance for the prevention of stone capturing can considerably be improved and also the shoulder wear in the shoulder portion and the heel and toe wear in the central portion can effectively be prevented.

What is claimed is:

1. A heavy duty pneumatic tire comprising: a tread having a block pattern composed of island portions and groove portions including a circumferential groove and a transverse groove, protrusions for the prevention of stone capturing disposed in the bottoms of the grooves, wherein a protrusion disposed at an intersect portion between at least two grooves among said protrusions is provided with a projected part protruding in an extending direction of each of said circumferential and transverse grooves and disconnected from any island portion of said block pattern.

2. The heavy duty pneumatic tire according to claim 1, wherein when a width of said circumferential groove at tread surface and a depth of said circumferential groove and W and D and a depth from tread surface to a top of said protrusion is d and a height of said protrusion from groove bottom of said circumferential groove is h, said circumferential groove and protrusion satisfy relations of $W/d \geq 0.8$ and $0.4 \leq h/D \leq 0.5$.

3. The heavy duty pneumatic tire according to claim 1, wherein said tread has a block pattern composed of at least five block rows defined by plural circumferential grooves and plural transverse grooves in the widthwise direction of the tire.

4. The heavy duty pneumatic tire according to claim 3, wherein each block in all of said block rows is provided with a blind sipe formed along the circumferential direction of the tire so as not to arrive at each transverse groove.

5. The heavy duty pneumatic tire according to claim 3, wherein each center block of a block row arranged at a central portion in widthwise direction of the tread and each second block of a block row arranged between the shoulder block and the center block in widthwise direction of the tread are provided with a blind sipe formed along the circumferential direction of the tire so as not to arrive at each transverse groove.

6. The heavy duty pneumatic tire according to claim 4 or 5, wherein said blind sipe has a width of not more than 2.5 mm.

7. The heavy duty pneumatic tire according to claim 4 or 5, wherein said blind sipe has a depth corresponding to 25-110% of a height of said block.

8. The heavy duty pneumatic tire according to claim 4, wherein a volume of said blind sipe in each block of a shoulder block row among said block rows is not more than 0.5% of volume of said block and a volume of said blind sipe in each block of center and second block rows among said block rows is 0.5-3.0% of volume of said block.

9. The heavy duty pneumatic tire according to claim 5, wherein a volume of said blind sipe in each block of center and second block rows among said block rows is 0.5-3.0% of volume of said block.

10. The heavy duty pneumatic tire according to claim 3, wherein each block in said center and second block rows is made from rubber having a modulus at 300% elongation of 90-140 kg/cm$^2$ and each block in said shoulder block row is made from rubber having a modulus at 300% elongation of 115-165 kg/cm$^2$.

11. The heavy duty pneumatic tire according to claim 10, wherein said modulus in said center and second block rows is larger than that of said shoulder block row.

12. The heavy duty pneumatic tire according to claim 2, wherein said protrusions have a width W and a length along said circumferential groove such that $\geq 0.2$ and $1/h \geq 1.0$.

13. The heavy duty pneumatic tire according to claim 8, wherein said volume of said blind sipe in each block of center and second block rows is 1.2-1.7% of volume of said block.

* * * * *